Nov. 2, 1943.     O. C. OLSEN     2,333,118
VENDING MACHINE FOR BOTTLED GOODS
Filed Sept. 24, 1941     8 Sheets-Sheet 1

Fig. 1.

INVENTOR.
Olaf Christopher Olsen
BY
ATTORNEY.

Nov. 2, 1943.  O. C. OLSEN  2,333,118
VENDING MACHINE FOR BOTTLED GOODS
Filed Sept. 24, 1941  8 Sheets-Sheet 2

INVENTOR.
Olaf Christopher Olsen
BY
ATTORNEY.

Fig. 3.

Nov. 2, 1943.   O. C. OLSEN   2,333,118
VENDING MACHINE FOR BOTTLED GOODS
Filed Sept. 24, 1941   8 Sheets-Sheet 4

INVENTOR.
Olaf Christopher Olsen
BY
ATTORNEY.

Nov. 2, 1943.   O. C. OLSEN   2,333,118
VENDING MACHINE FOR BOTTLED GOODS
Filed Sept. 24, 1941   8 Sheets-Sheet 6

INVENTOR.
Olaf Christopher Olsen
BY
ATTORNEY.

INVENTOR.
Olaf Christopher Olsen
BY

ATTORNEY.

Patented Nov. 2, 1943

2,333,118

UNITED STATES PATENT OFFICE 2,333,118

VENDING MACHINE FOR BOTTLED GOODS

Olaf Christopher Olsen, Kansas City, Mo., assignor to C. Earl Hovey, Kansas City, Mo., trustee Application September 24, 1941, Serial No. 412,153

19 Claims. (Cl. 225—21)

This invention relates to vending machines for bottled goods and has for one of its objects to provide apparatus capable of withdrawing a capped bottle from a cooling chamber, decapping said bottle, and pouring the contents thereof in a container disposed for the purpose upon operation of the equipment, either by the insertion of a coin or the like, or upon manual manipulation of parts arranged for the purpose.

One of the important aims of the instant invention is the provision of a vending machine for bottled goods, having means for automatically withdrawing a capped bottle from the storage chamber of the machine, decapping and pouring the contents thereof, automatically and without attention by the operator, and thereafter returning the emptied bottle to the cooling chamber.

Another object of the invention is to provide a machine of the aforementioned character having means for automatically removing a capped bottle from the cooling chamber near the bottom thereof, decapping and pouring the contents of the bottle as it is elevated toward the upper portion of the cooling chamber, and causing the bottle to dwell a short period of time in its upward travel to completely empty the contents thereof.

Further objects of this invention include the provision in a bottle vending machine of means for removing a capped bottle from a cooling chamber where the same is in a horizontal position, elevating the bottle to a point near the upper portion of the cooling chamber, decapping the bottle as it travels upwardly and after the same has been moved to a substantially upright position, thereafter tilting the bottle to an inclined position where the contents thereof may flow into a suitable container and returning the elevating means to its point of beginning, after depositing the empty bottle in a part of the machine designed for receiving the empty bottle, after the same has been returned to a substantially horizontal position.

A still further aim of this invention is to provide a vending machine for bottled goods, the capacity whereof is exceptionally great for the size of the cooling chamber provided therein, and the means for progressively feeding the bottles from the chamber is arranged to receive the empty bottles after the same have had the contents thereof poured into a container.

Additional objects of the invention include many details of construction whereby a vending machine for bottled goods is rendered commercially practicable, automatically operable upon the insertion of a coin through all cycles without attention of the operator, and capable of performing the steps of decapping, emptying and disposing of the bottle in a desirably short length of time.

Other objects of the invention will become apparent to those skilled in the art during the following specification, referring to the accompanying drawings wherein;

Cabinet 24, used to house the mechanism, is constructed in a conventional manner in that it has insulated walls to reduce refrigeration losses to a minimum.

Cabinet 24 has a cooling chamber 26 therein for the storage of both capped and uncapped bottles 28 and 30 respectively. Means for refrigerating chamber 26 is not here shown and forms no part of the invention, since conventional mechanical refrigeration may be employed if desired and the parts thereof other than the cooling coils installed in a compartment 32 in cabinet 24.

Figure 1:
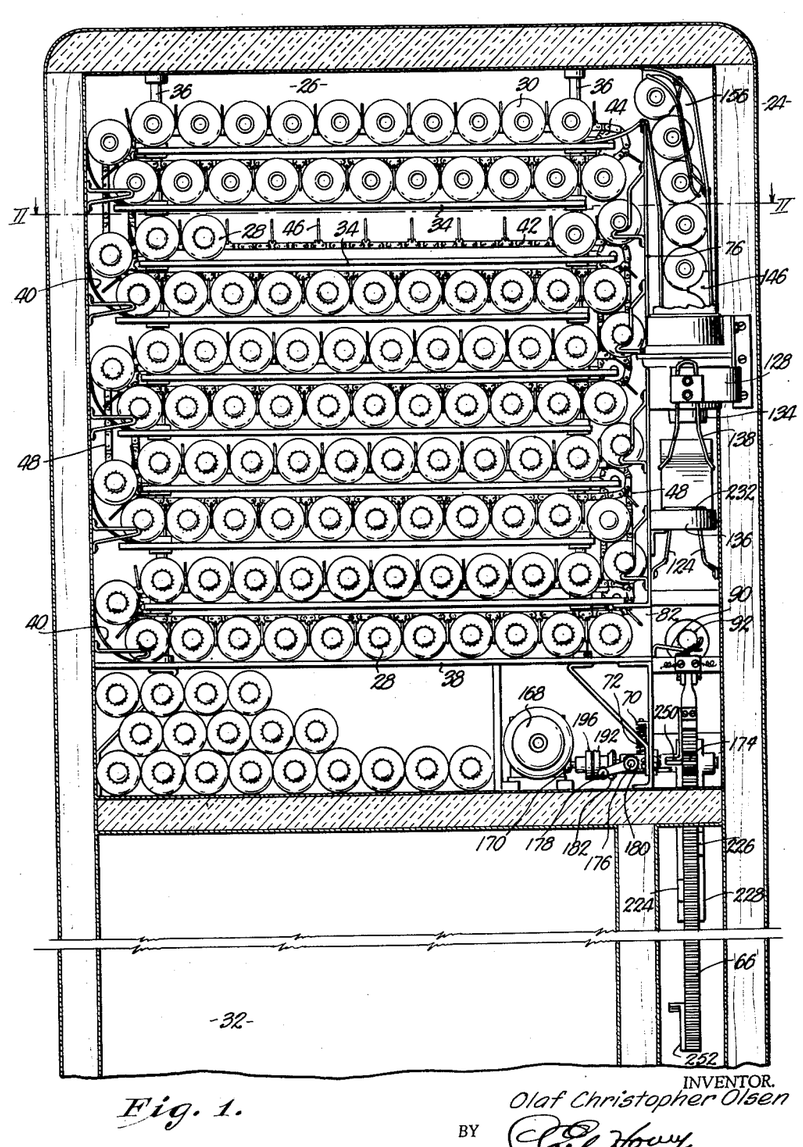
Fig. 1 is a front elevational view of a vending machine for bottled goods made in accordance with the present invention.
Figure 2:
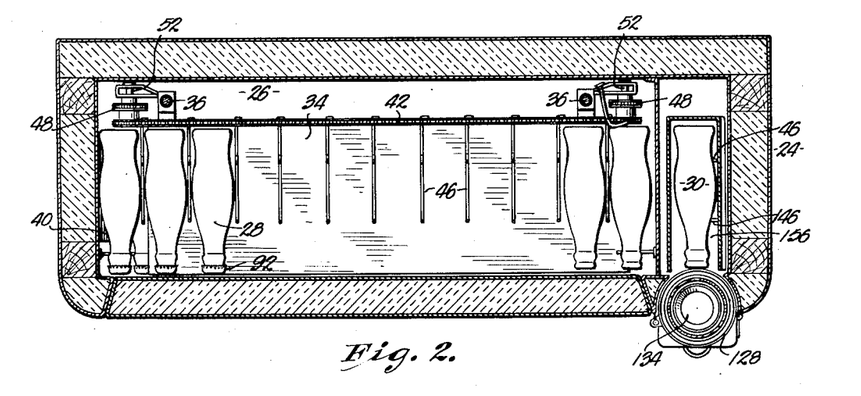
Fig. 2 is a transversely sectional view through the machine taken on line II—II of Fig. 1.
Figure 3:
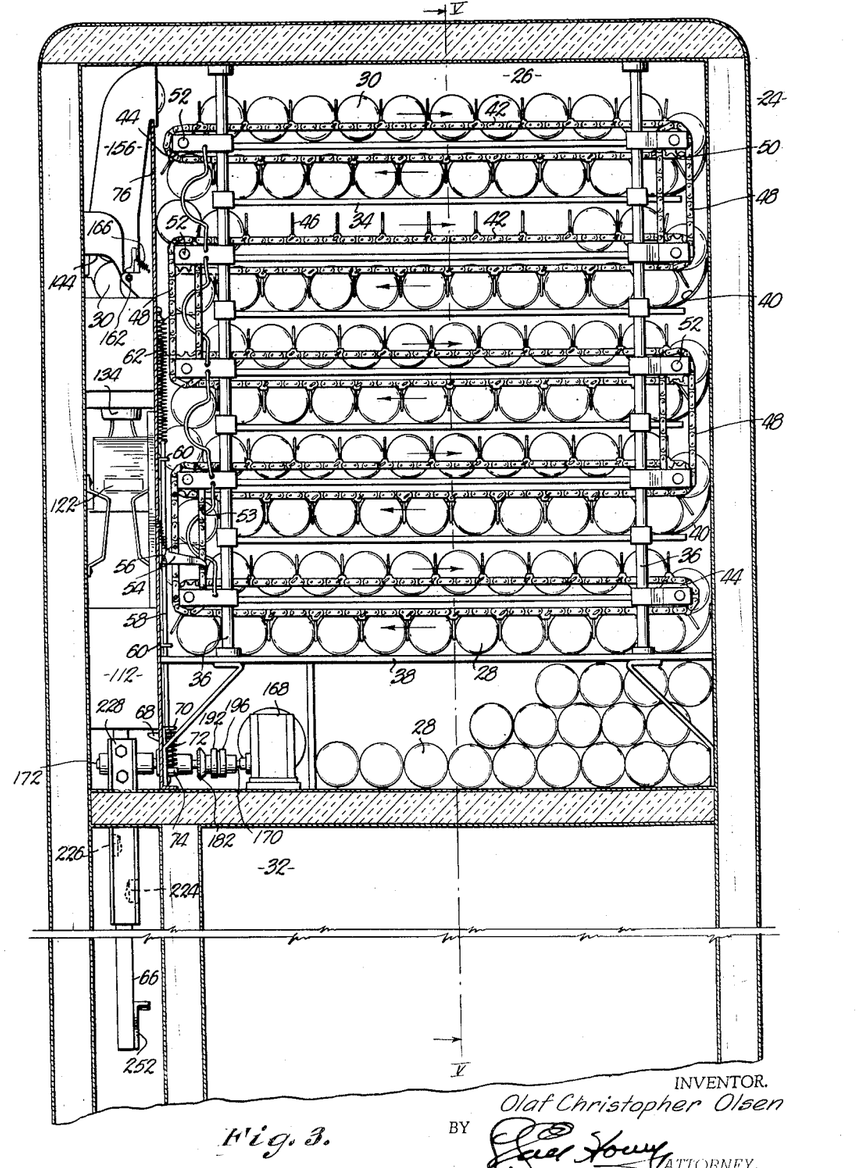
Fig. 3 is a rear elevational view with parts of the cabinet removed to reveal the operating parts.
Figure 4:
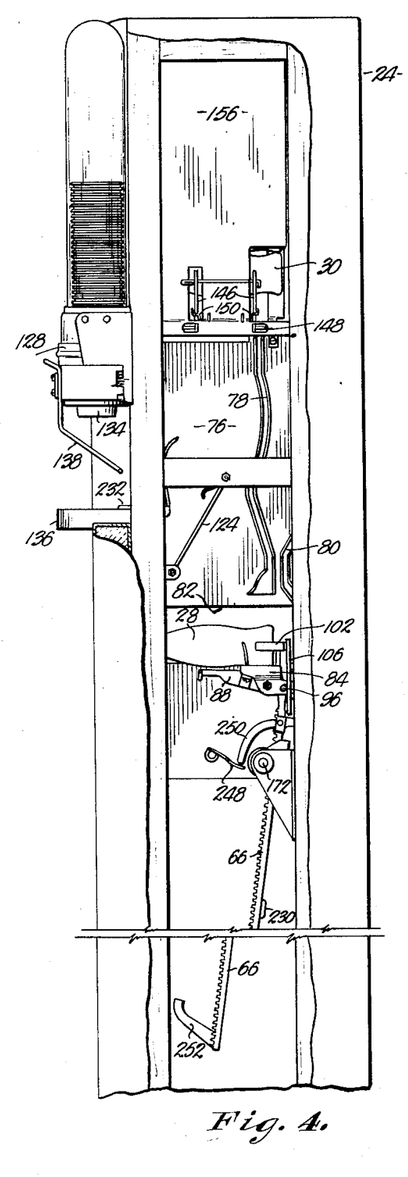
Fig. 4 is an edge elevational view of the vending machine with a portion of the wall of the cabinet broken away to disclose underlying parts.
Figure 5:
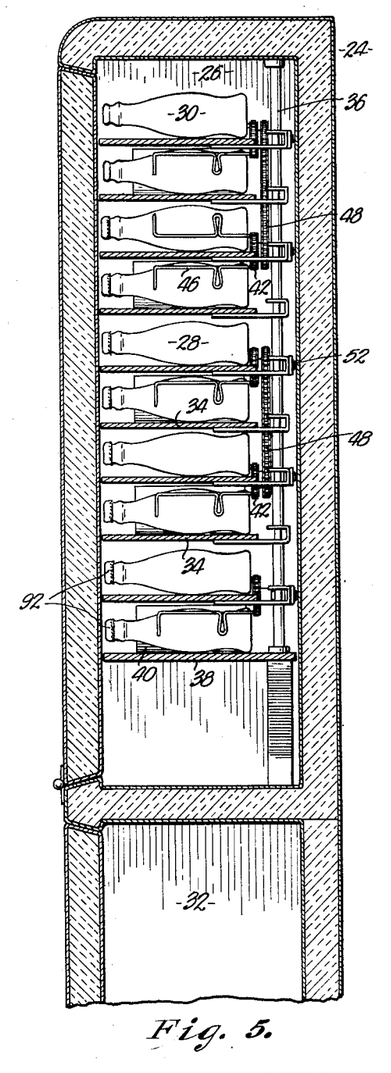
Fig. 5 is a vertical sectional view through the upper portion of the vending machine taken on line V—V of Fig. 3.

A series of shelves 34 is in cooling chamber 26 and these shelves 34 are mounted upon supports 36 carried by partition 38 and the upper wall of cabinet 24. Shelves 34 have their ends offset as illustrated in Fig. 1, for example, to establish a serpentine path through which the bottles travel. During the movement of the bottles they roll over the upper surface of shelves 34 and are guided from one shelf to a shelf 34 immediately therebelow by arcuate aprons or the like 40.

The manner of moving the bottles as aforesaid is through the medium of a number of endless chains 42 mounted on sprockets 44 carried by supports 36. These endless chains have laterally extending pushers 46 overhanging shelves 34 between the bottles—thus, a number of stalls are established, each of which receives a bottle when the machine is loaded.

Shelves 34 constitute a rack to receive all of the bottles and because the means for moving the bottles toward a point of discharge is located to one side of the shelves, the opposite sides thereof are entirely open to receive bottles when the same are introduced to any point along the entire length of the rack on shelves 34. In loading the machine it is unnecessary to move the apparatus that urges the bottles toward the point where decapping and pouring of the contents thereof is started. The case in which the bottles are stored and cooled has its one side completely unobstructed when the door is swung to the open position. This feature of the machine is of great importance for it expedites the loading and permits replacing a bottle at any point along the rack without disturbing the remaining bottles. When the bottles are in place, they are all in a horizontal position with the ends thereof in substantially the same vertical plane.

Endless chains 42 are simultaneously operated by connecting chains 48 passing over sprockets 50 on shafts 52 that support sprockets 44. One of connecting chains 48 has a number of pins 53 projecting laterally therefrom to be engaged by dog 54 pivotally mounted as at 56 on operating bar 58. This operating bar is reciprocably journalled in bearings 60 and maintained at one end of its path of travel by spring 62. This operating bar 58 is movable during the operation of the pin 64 mounted on rack 66. Pin 64 strikes ear 68 on yoke 70 and when springs 72 are compressed sufficient force is exerted upon operating bar 58 in a downward direction to move chain 48, which in turn advances all bottles in the entire rack one step.

Springs 72 are interposed between yoke 70 and outturned lugs 74, rigidly mounted on bar 58 for the purpose of absorbing any shock and thereby eliminating destructive action and overcoming any tendency to create noisy, abrupt advancement of the bottles. Ear 68 projects through a slot in partition 76 whereon is mounted a pair of tracks 78 and 80 respectively. These tracks terminate at the bottom of chamber 26 near opening 82 through which a capped bottle 28 is fed and below which cradle, generally designated by the numeral 84, is disposed. This cradle has a spring 86 therein upon which the capped bottle drops and an extension 88 against which the neck of the bottle rests when in a substantially horizontal position and after cradle 84 starts its upward movement.

Figure 6:
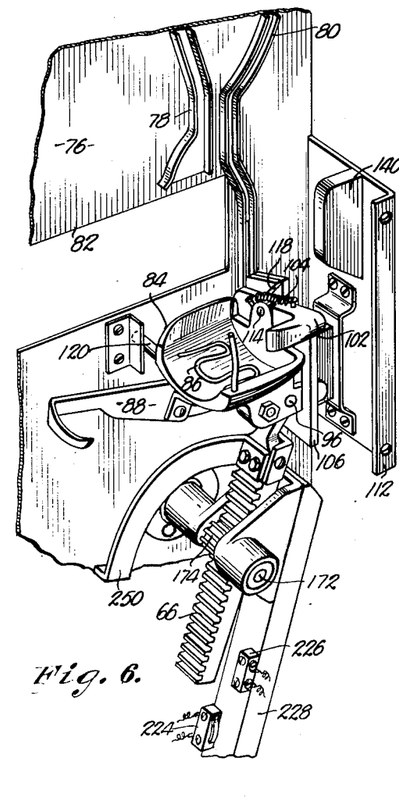
Fig. 6 is an enlarged detailed perspective view of the bottle cradle and associated parts.
Figure 7:
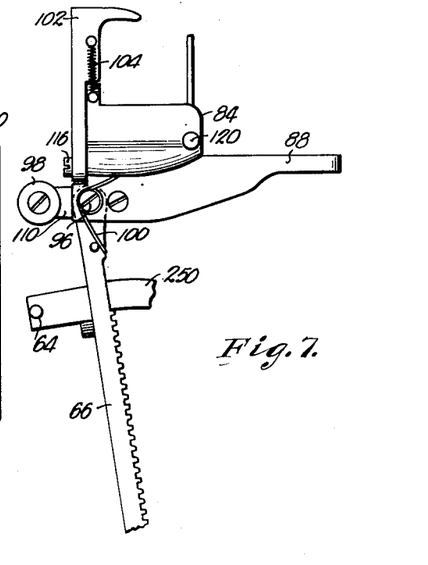
Fig. 7 is a fragmentary detailed side elevational view of the bottle cradle shown in Fig. 6.

Support 90 carries the neck of capped bottle 28 when it is first fed from chamber 26 and maintains cap 92 of the bottle in position to close switch 94 to insure that the machine will operate only when a capped bottle 28 is being acted upon. Cradle 84 is pivotally mounted as at 96 on the upper end of rack 66 and is equipped with a roller 98 and a spring 100, the latter serving to yieldably maintain cradle 84 in the position shown in Figs. 6 and 7.

A clamp 102 yieldably held in the operative position and against pin 103 by spring 104 cooperates with cradle 84 in gripping the base of a capped bottle 28. This gripping action occurs immediately upon upward movement of cradle 84 and rack 66.

The means for causing clamp 102 to move to the operative position comprises a plate 106 slotted as at 108 to receive the rearwardly extended portion 110, upon which is mounted roller 98. Plate 106 is rigidly mounted on bracket 112 carried by partition 76. Clamp 102 is pivotally mounted as at 114 intermediate its ends and while one end thereof is laterally projected to overlie the side of the bottle the other end has a pin 116 thereon to ride in guide slot 118 of plate 106. During the very first portion of the upward movement of cradle 84, clamp 102 is drawn into engagement with the bottle. A laterally projecting pin 120 on cradle 84 enters tracks 78 as said cradle continues to be lifted while pin 64 on the upper end of rack 66 rides in track 80.

As cradle 84 elevates capped bottle 28 toward decapper 122, the bottle is tilted to a position where the cap 92 thereof is engaged by decapper 122. This decapper is assisted in its operation upon cap 92 by guides 124 that insure centering of the bottle as it is tilted.

Figures 8, 17, 18:
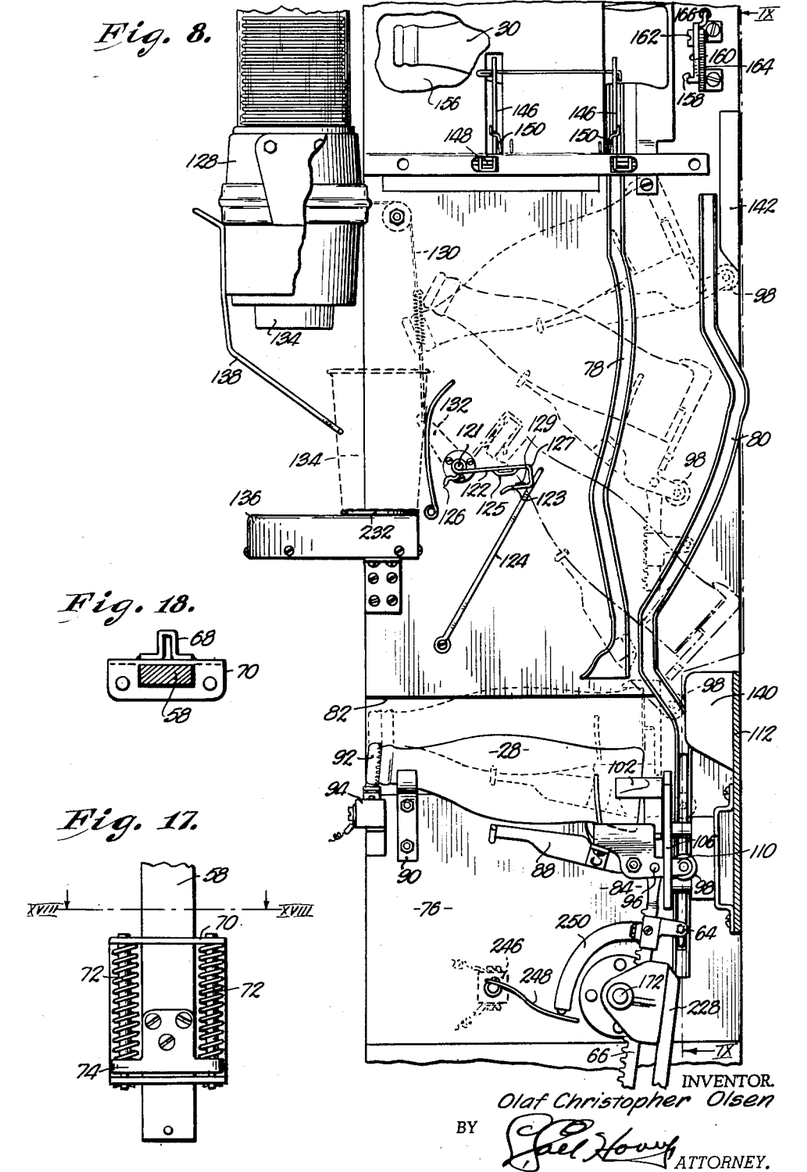
Fig. 8 is an enlarged side elevational view of the bottle elevating and decapping equipment, showing the bottle in the many positions assumed as the same is raised from point of delivery to the point of return.
Fig. 17 is a fragmentary detailed view illustrating the portion of the operating rod for the bottle feed.
Fig. 18 is a sectional view taken on line XVIII—XVIII of Fig. 17.

Decapper 122 is pivotally mounted on shaft 121 carried by the end of cabinet 24 and partition 76, and a spring 126 yieldably maintains the decapper in the position shown in full lines of Fig. 8. One leg 123 of decapper 122 is bifurcated to straddle the neck of the bottle immediately below cap 92 to insure an even pull on each side thereof. Bottle 28 is moved longitudinally in a straight line against decapper 122 to rotate the latter about its mounting. Thus the cap is forced against hump 125 on leg 127 and is pried from place.

A conventional cup feeding mechanism 128 mounted on cabinet 24 is operably joined to decapper 122 through the medium of a cable 130 and arm 132. This cup dropping mechanism 128 is obtainable on the open market and further description thereof is unnecessary.

When the containers 134 are fed from 128, a drop by gravity to shelf 136, and in some instances, a guide 138 may be desired. Cup shelf 136 is specially made with current controlling switches, but will hereinafter be described.

After cap 92 is withdrawn from bottle 28 the continued upward movement of cradle 84 tilts the bottle to a downwardly inclined position shown in the uppermost dotted lines of Fig. 8, where the contents of the bottle is poured into container 134. During the decapping operation, roller 98 bears against block 140 to insure rigidity and this same roller is positioned adjacent the inclined face of member 142 during the pouring operation. It is at this point during the upward movement of the bottle that a dwell occurs through the medium of the hereinafter described electrical circuit.

When the contents of the bottle has been emptied into container 134 and cradle 84 continues to rise, the empty bottle 30 is released from cradle 84 because clamp 102 rides along cam face 144 to move the clamp away from the bottle. Due to the form of tracks 78 and 80, the bottle has been returned to a substantially horizontal position where it strikes dogs 146 pivotally mounted as at 148 to cabinet 24 and yieldably held in the position shown in full lines of Figs. 9 and 10 by springs 150. Cam faces 152 of dogs 146 are inclined upwardly and outwardly from the inner face of cabinet 24 and as bottle 30 is forced against said faces, the dogs move into pockets 154 provided for the purpose of affording clearance. As soon as the bottle is lifted above dogs 146 they snap to the position below the bottle, as shown in Fig. 1, to hold the same in the empty bottle conduit 156, the upper end of which is adjacent to the top of chamber 26 and disposed to feed empty bottles onto uppermost shelf 34.

When the bottle is so positioned, pin 116 of clamp 102 will be resting upon the top of flange 158 on plate 160 that is pivotally mounted as at 162 to a bracket 164 carried by partition 76. Spring 166 urges plate 160 toward the position shown in Fig. 9, but downward movement of cradle 84 after clamp 102 has been disengaged from the bottle, will continue until pin 116 of clamp 102 has dropped from flange 158—thus, cradle 84 will return empty bottles to the point of beginning, i. e., a place in the rack.

From the foregoing it will be observed that a complete cycle has been described, so far as removing a capped bottle from the cooling chamber is concerned, and thereafter elevating the capped bottle, decapping the same, pouring the contents thereof into a container, and then redepositing the emptied bottle into the cooling chamber 26. An electrical motor 168 of reversible type, is employed to motivate the parts of the vending machine. This motor is connected to rack 66 through the medium of its drive shaft 170 and a driven shaft 172 upon which is mounted a pinion 174 in mesh with rack 66.

In some instances it is desirable to adjust the machine and time the same without the necessity of running motor 168. For that purpose there is provided a manually rotatable shaft 176 upon which is mounted crank 178 and bevel gear 180. A bevel gear 182 is splined on driven shaft 172, and therefore, is movable longitudinally to either one of two stations where ball 184 is in either detent 186 or 188.

When it is desired to manually manipulate the machine, ball 184 is moved to detent 188 whereupon bevel gears 180 and 182 are in mesh and motor 168 is not in connection with shaft 172. Movement of bevel gear 182 to the position just described, removes pins 190 on collar 192 from sockets 194 in sleeve 196, and likewise removes pins 198 on sleeve 196 from sockets 200 in collar 192.

Figures 11, 12, 19:
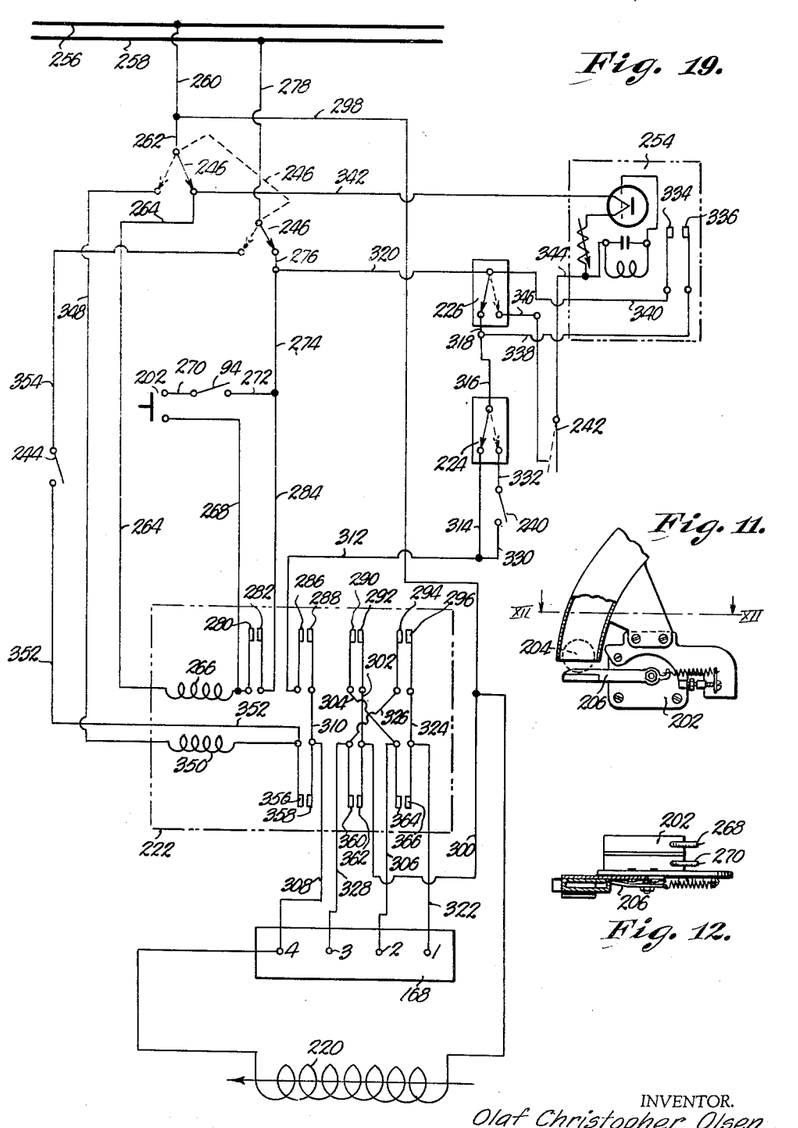
Fig. 11 is a fragmentary detailed view illustrating the coin switch.
Fig. 12 is a sectional view taken on line XII—XII of Fig. 11.
Fig. 19 is a wiring diagram of the electrical circuit employed in the vending machine.
Figures 13, 14, 15:
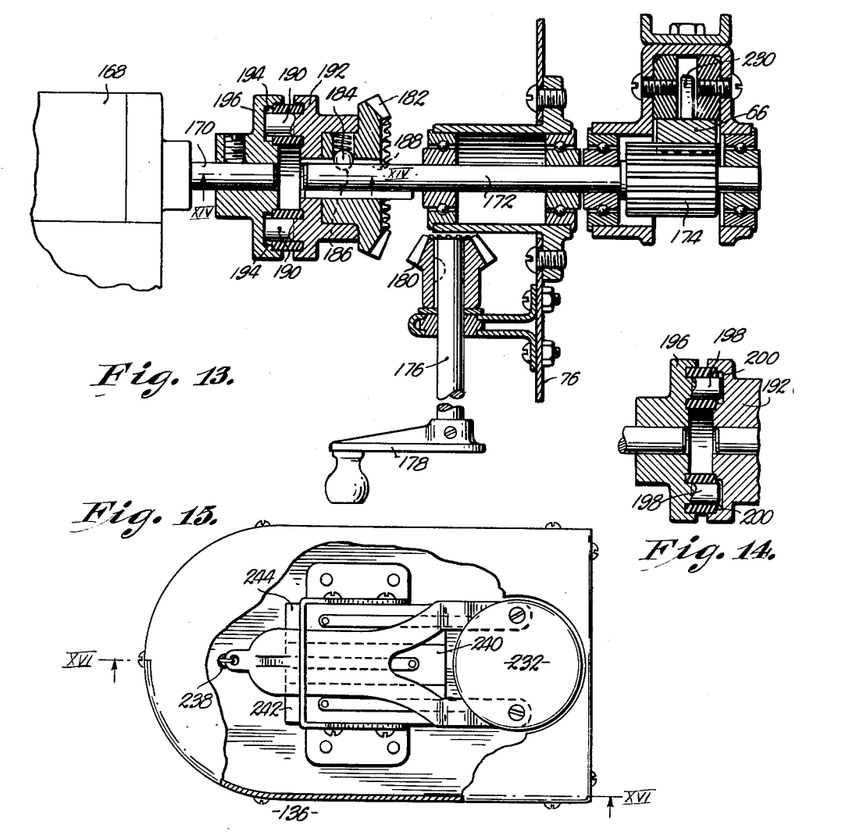
Fig. 13 is a fragmentary sectional view through the mechanism establishing connection between the drive shaft of the motor and the operating rack.
Fig. 14 is a sectional view through a portion of the mechanism taken on line XIV—XIV of Fig. 13.
Fig. 15 is a top plan view of the cup shelf, part of its under-wall being broken away to reveal its underlying switches.
Figure 16:
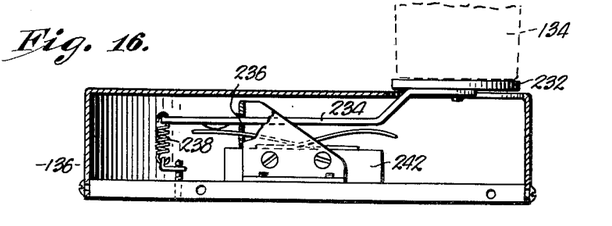
Fig. 16 is a sectional view taken on line XVI—XVI of Fig. 15.

The electrical circuit employed is diagrammatically shown in Fig. 19 and it is contemplated that the vending machine will automatically operate upon depositing therein a coin, token or the like, and if such automatic operation is desired, coin switch 202 is closed by coin 204, as shown in Fig. 11. The weight of the coin moves switch arm 206 to a place where the terminals of said switch are closed.

Figures 9, 10, 20, 21:
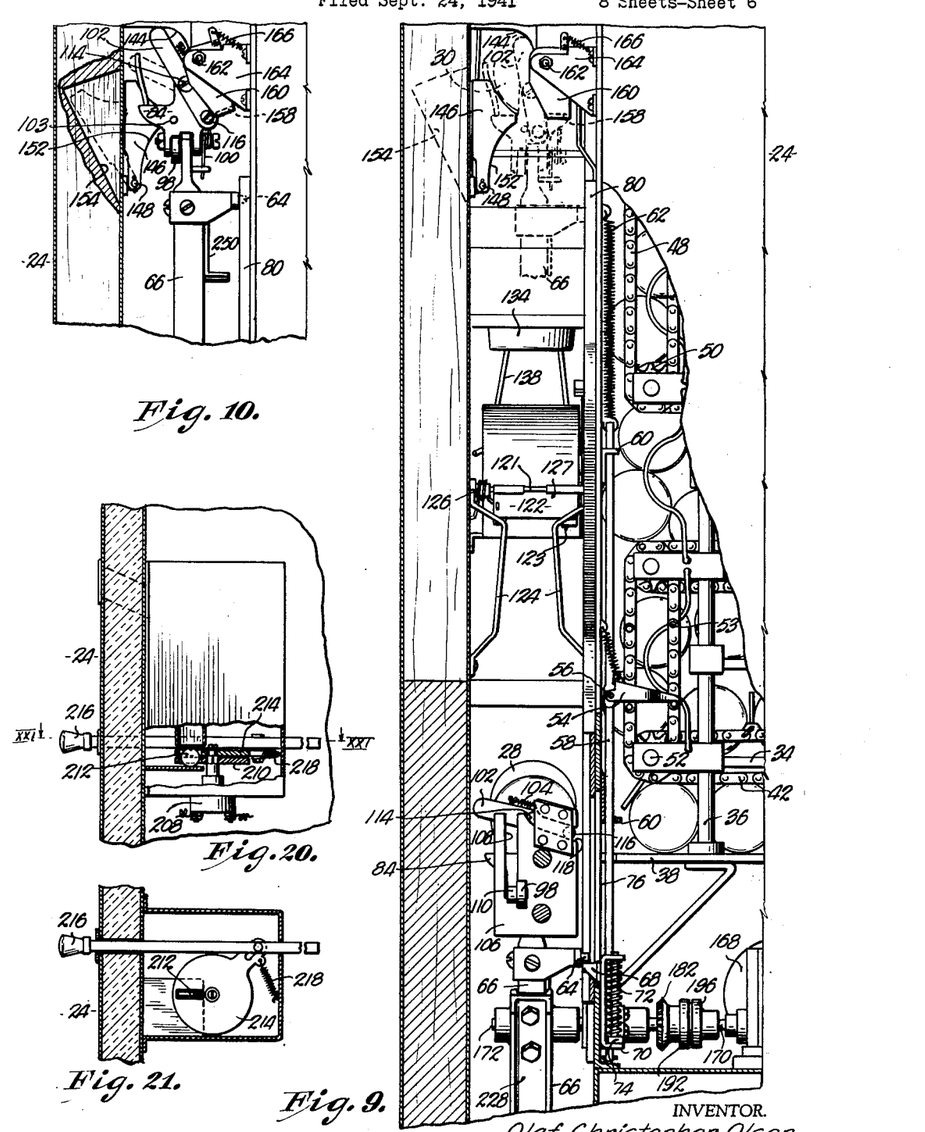
Fig. 9 is a sectional view taken on line IX—IX of Fig. 8, illustrating the manner of moving the bottles toward the point of discharge from the cooling chamber.
Fig. 10 is a fragmentary detailed view illustrating that part of the machine near the point where the empty bottle re-enters the chamber.
Fig. 20 is a fragmentary detailed sectional view through a coin operated coin controlled switch made in accordance with a modified form of the invention.
Fig. 21 is a sectional view taken on line XXI—XXI of Fig. 20.

If the coin is to be dropped and a part of the machine manually manipulated before the operation starts, then a switch, such as shown in Figs. 20 and 21, may be employed. In this embodiment of the invention, switch 208 is closed only when slotted plate 210 is rotated. Such rotation may occur only when coin 212 rests between slotted plate 214 and plate 210 to interlock the same. Pull rod 216 is drawn outwardly by the operator and switch 208 is closed a sufficient length of time to complete the circuit as is switch 202. Spring 218 yieldably maintains pull rod 216 in a normal position.

Motor 168 has a solenoid 220 to serve as a means for braking the armature and is also equipped with reversing parts of conventional nature, broadly designated by the numeral 222 in Fig. 19. Such electrical equipment is purchased on the open market and forms no part of the invention other than to cause the hereinabove described mechanism to operate as contemplated.

In addition to coin switch 202 there is provided a switch 224 and a switch 226 on arm 228, both of which lie in the path of travel of boss 230 on rack 66. Arm 228 remains stationary and as rack 66 travels upwardly the boss 230 thereon first strikes switch 224 and then switch 226.

Cup shelf 136 has a platform 232 mounted on a lever 234 fulcrumed as at 236 and maintained in normal position by a spring 238. There are three switches in this cup shelf 136, i. e., 240, 242 and 244. The weight of the empty container 134 upon platform 232 is sufficient to close switch 240.

A reverse and forward switch 246 in the motor circuit has an arm 248 to be struck by finger 250 when rack 66 is at its lowermost point (Fig. 8), to connect motor 168 for forward movement, while finger 252 on rack 66 strikes arm 248 to throw switch 246 to a position to reverse motor 168 when rack 66 has reached its uppermost position.

The numeral 254 designates a conventional vacuum tube time delay, effective when the weight of container 134 and its contents reaches a predetermined point to close switch 242 in cup shelf 136.

Repeating the cycle of operation for purpose of describing the electrical control, coin 204 is dropped into a suitable coin chute of conventional character, not here shown, and if desired, through a well-known slug ejector as is now the custom. Switch 202 is closed and energy supplied to motor control relay bank 222 through a circuit including switch 94 held closed by cap 92 on capped bottle 28 that is in cradle 84. At this juncture it should be made clear that when the machine is loaded and set, a capped bottle 28 is positioned in cradle 84 and from this time on, a bottle is always in place in cradle 84 to close switch 94. If no cap is present, the machine will not operate.

The circuit completed by dropping coin 204, is as follows:

From power line 256 through wire 260, wire 262, one closed arm of switch 246, wire 264, forward relay coil 266, wire 268, closed coin switch 202, wire 270, closed switch 94, wire 272, wire 274, wire 276, the other closed arm of switch 246, and wire 278 to power line 258.

When this circuit is closed momentarily by coin 204, coil 266 is energized to close contact points 280 and 282 of the forward relay in control 222. Immediately following the closing of points 280 and 282, coin 204 drops by gravity and opens switch 202 whereupon coil 266 is maintained energized through the following circuit:

Line 256, wire 260, wire 262, one closed arm of switch 246, wire 264, coil 266, contacts 280 and 282, wire 284, wire 274, wire 276, other closed arm of switch 246, and wire 278 to line 258.

When coil 266 closes points 280 and 282, it also closes contact points 286, 288 and 290, 292, and 294, 296. When these points are closed, motor 168 receives current through the following circuit:

From line 256 through wire 260, wire 298, wire 300, wire 302, closed contacts 292 and 290, wire 304, wire 306, to terminal 2 of motor 168. The internal circuit of motor 168 connects terminals 2 and 1. From terminal current passes through wire 322, wire 324, closed contacts 296 and 294, wire 326, wire 328, to terminal 3. Internal circuit of motor 168 connects terminals 3 and 4. From motor 168, through terminal 4, wire 308, wire 310, closed contacts 288 and 286, wire 312, wire 314, closed side of switch 224, wire 316, wire 318, closed side of switch 226, wire 320, wire 276, switch 246, wire 278 to line 258.

Motor 168 elevates rack 66 to a point where bottle 28 is decapped and container 134 is deposited on platform 232 of cup shelf 136, to close switch 240. Boss 230 now engages switch 224, throwing its arm into the position shown in dotted lines of Fig. 19. The circuit previously outlined is broken when switch 224 is reversed and therefore motor 168 would stop unless a container 134 is in place to close switch 240 when switch 224 is engaged by boss 230, as just set forth.

When switch 224 is as shown in dotted lines and switch 240 is closed, motor 168 receives current through the following circuit:

Line 256, wire 260, wire 298, wire 300, wire 302, closed contacts 292 and 290, wire 304, wire 306, to terminal 2 on motor 168, from motor 168 through terminal 1, wire 322, wire 324, closed contacts 296 and 294, wire 326, wire 328, terminal 3 of motor 168, terminal 4 of motor 168, wire 308, wire 310, closed contacts 288 and 286, wire 312, wire 330, closed switch 240, wire 332, switch 224 (dotted line position), wire 316, wire 318, switch 226, wire 320, wire 276, switch 246, wire 278 to line 258.

As rack 66 continues to rise, boss 230 passes switch 224 allowing its arm to return to full line position. Boss 230 then engages switch 226 to move its arm to the dotted line position. When rack 66 is high enough to cause boss 230 to strike switch 226, the bottle being elevated has been tilted to pour its contents into container 134. This position is illustrated by the uppermost dotted line position of the bottle in Fig. 8.

Under these conditions and when switch 226 has been moved to the position shown in dotted lines of Fig. 19, motor 168 is stopped to cause a dwell of sufficient duration to permit all the liquid in the bottle to flow therefrom.

Throwing switch 226 to the dotted line position while boss 230 is passing, connects time delay unit 254, and switch 242 in circuit with motor 168. When switch 242 is closed (after boss 230 has struck switch 226), by the combined weight of container 134 and its contents, time delay unit is in the following circuit, which includes the motor 168 but which will not operate until contacts 334 and 336 in time delay unit 254 are closed:

Line 256, wire 260, wire 298, wire 300, wire 302, closed contacts 292 and 290, wire 304, wire 306, terminal 2 on motor 168, from terminal 1 of motor 168, wire 322, wire 324, closed contacts 296 and 294, wire 326, wire 328, terminal 3 of motor 168, terminal 4 of motor 168, wire 308, wire 310, closed contacts 280 and 286, wire 312, wire 314, switch 224, wire 316, wire 338, to contacts (now open), 336 and 334 in time delay 254, wire 340, wire 320, wire 276, switch 246, wire 278 to line 258.

The time delay unit 254 is energized by closing switch 242 while switch 226 is in dotted line position. It is important that boss 230 remain against switch 226 to hold its arm in the dotted line position until motor 168 is again started through the action of time delay unit and switch 242. When the container is heavy enough to close switch 242, time delay unit 254 is energized through the following circuit:

Line 256, wire 260, wire 262, switch 246, wire 342, to time delay unit 254, from said unit through wire 344, switch 242 (now closed by weight of container 134 and its contents), wire 346, switch 226, wire 320, wire 276, switch 246, wire 278 to line 258.

When sufficient time has been allowed (about 3 seconds), to completely drain the bottle, time delay unit 254 closes contacts 334 and 336 and the motor 168 is started. The rack 66 continues upwardly until finger 252 strikes reversing switch 246 whereupon motor 168 will stop because switch 244 is open and in circuit with the reverse switch supplying current to the motor. When switch 246 is reversed in position, coil 266 is de-energized to open all of contacts in the forward relay. At this point in the cycle empty bottle 30 is released from cradle 84, as above set down.

Switch 244 in shelf 136 is in the reverse relay coil circuit which contacts motor 168, and is opened by the weight of container 134 and the liquid poured therein. The remaining switches in shelf 136 are only in the forward circuit.

Motor 168 is started to return the bottle gripping and elevating means when the filled container 134 is removed from platform 232 of shelf 136 by the operator. When such occurs, switch 244 is closed and the motor reversed through the following circuit:

Line 256, wire 260, wire 262, switch 246 in dotted position, wire 348, relay coil 350, wire 352, closed switch 244, wire 354, switch 246 (now in dotted position), wire 278 to line 258.

When coil 350 is thus energized, contact points 356, 358 and 360, 362 and 364, 366 are closed. Motor 168 now has internal connections joining terminal 3 to 1 and 2 to 4 and receives current through the following circuit:

Line 256, wire 260, wire 298, wire 300, closed contacts 360 and 362, wire 328 to terminal 3 of motor 168; from terminal 1 to wire 322, closed contacts 364 and 366, wire 306 to terminal 2 internally to terminal 4, wire 308, closed contacts 356 and 358, wire 352, closed switch 244, wire 354, switch 246 (dotted position), wire 278 to line 258.

When rack 66 reaches its lowermost point and has been returned to its point of beginning, finger 250 will again engage arm 248 of switch 246 to set up the circuit for actuating the machine when a coin is again dropped.

When the rack 66 approaches its lowermost position, the last 2½ to 3 inches of travel is employed to feed another capped bottle 28 from the rack. This feeding occurs when pin 64 strikes ear 68 on yoke 70 to move operating bar 58 downwardly to cause dog 54 to engage one of pins 52 on chain 48.

As this final downward movement occurs, clamp 102 is moved to on side, as shown in Fig. 9, by its pin 116 engaging slot 118 in plate 106. The bottle is engaged by clamp 102 only when the upward movement of the elevating means is started as above mentioned.

Having thus described the invention, what is claimed as new and desired to be secured by Letters Patent is:

1. In a vending machine for bottled goods, a chamber adapted to contain a plurality of substantially horizontally arranged, capped bottles; means operable upon operation of the machine to remove one of the bottles from said chamber at the bottom thereof and to position the same substantially upright; means for automatically decapping said substantially upright bottle; means for tilting said decapped bottle to a downwardly inclined position to discharge the contents thereof; and means for then returning the empty bottle to a horizontal position and depositing the same back into the chamber at the top thereof.

2. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; and means for decapping the bottle as it is elevated.

3. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; and means for automatically positioning the bottle in an upright position during its upward movement and while the same is being decapped.

4. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; and means for automatically positioning the bottle in a substantially upright position during its upward movement, while the same is being decapped, said last mentioned means having parts for tilting said decapped bottle to a downwardly inclined position to discharge the contents thereof as the bottle is elevated.

5. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; means for automatically positioning the bottle in a substantially upright position during its upward movement, while the same is being decapped and for tilting said decapped bottle to a downwardly inclined position to discharge the contents thereof; and means for momentarily arresting the upward movement of the bottle during the time the same is in the inclined position to discharge the contents thereof.

6. In a vending machine for bottled goods, a chamber adapted to contain a plurality of substantially horizontally arranged capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; and means for automatically positioning the bottle in a substantially upright position, for tilting said decapped bottle to a downwardly inclined position to discharge the contents thereof and for returning the empty bottle to a horizontal position to be deposited back into the chamber, all as the bottle is elevated.

7. In a vending machine for bottled goods, a chamber adapted to contain a plurality of substantially horizontally arranged capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; means for automatically positioning the bottle in a substantially upright position, for tilting said decapped bottle to a downwardly inclined position to discharge the contents thereof and for returning the empty bottle to a horizontal position to be deposited back into the chamber, all as the bottle is elevated; and means for momentarily arresting the upward movement of the bottle during the time the same is in the inclined position to discharge the contents thereof.

8. In a vending machine for bottled goods, a chamber adapted to contain a plurality of capped bottles; means operable upon operation of the machine to automatically remove one of the bottles from the chamber; means for automatically positioning a container to receive the contents of the removed bottle; means for automatically decapping the removed bottle when in a substantially upright position; means for automatically tilting the decapped bottle to a downwardly inclined position to pour the contents thereof into the container; and means controlled by the container, after the same has received a predetermined amount of the contents of a bottle, to automatically cause the bottle to dwell in the said inclined position a predetermined period of time and thereafter be deposited in a portion of the machine arranged for that purpose.

9. In a vending machine for bottled goods, a chamber adapted to contain a plurality of substantially horizontally arranged, capped bottles;

means operable upon operation of the machine to automatically remove one of the bottles from the chamber at the bottom thereof; means for gripping the said removed bottle and to elevate the same toward the upper portion of the chamber; means for automatically decapping the said bottle as it is elevated; means for automatically tilting the decapped bottle to a downwardly inclined position to pour the contents thereof into a suitable container; means for causing the gripping means and the bottle to continue their upward movement after the bottle has remained in the inclined position a predetermined length of time; and means to return the gripping means to the point of beginning its upward movement.

10. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; and structure for rendering the gripping and elevating means inoperative when a bottle without a cap is presented to the gripping means at the point of removal.

11. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; and means for automatically returning the gripping means to its point of beginning.

12. In a vending machine for bottled goods, a chamber adapted to contain a plurality of substantially horizontally arranged, capped bottles; means operable upon operation of the machine to move the bottles through a path within the chamber toward a point of removal at the bottom thereof; means to automatically grip one of the bottles as it passes from the chamber and to elevate the same toward the top of the chamber; means for decapping the bottle as it is elevated; means for tilting the decapped bottle to a downwardly inclined position to pour the contents thereof into a suitable container; and means for returning the gripping means to its point of beginning only when the container is moved from its normal position.

13. In a vending machine for bottled goods, a chamber adapted to contain a plurality of substantially horizontally arranged, capped bottles; motor operated means for delivering one of the bottles from the chamber; means for closing the motor circuit to cause the same to operate the delivery means; a cradle for holding the bottle after delivery thereof; means driven by the motor for elevating the cradle and bottle; means for decapping the bottle as it is elevated; and guides for shifting said cradle to alter the angle of inclination of the bottle as it is elevated.

14. In a vending machine for bottled goods, a chamber adapted to contain a plurality of substantially horizontally arranged, capped bottles; motor operated means for delivering one of the bottles from the chamber; means for closing the motor circuit to cause the same to operate the delivery means; a cradle for holding the bottle after delivery thereof; means driven by the motor for elevating the cradle and bottle; means for decapping the bottle as it is elevated; and guides for shifting said cradle to alter the angle of inclination of the bottle as it is elevated, said bottle being supported in a substantially upright position by the cradle when decapping occurs.

15. In a vending machine for bottled goods, a chamber adapted to contain a plurality of substantially horizontally arranged, capped bottles; motor operated means for delivering one of the bottles from the chamber; means for closing the motor circuit to cause the same to operate the delivery means; a cradle for holding the bottle; means driven by the motor for elevating the cradle and bottle; means for decapping the bottle as it is elevated; guides for shifting said cradle to alter the angle of inclination of the bottle as it is elevated; and structure for removing the bottle from the cradle and directing the same back into the chamber.

16. In a vending machine for bottled goods, means for elevating a bottle through a vertical path of travel; means for holding the bottle in a substantially upright position; a pivotally mounted decapper in the path of travel and disposed to engage the cap of the bottle when in the substantially upright position; and means for forcing the bottle against the decapper through a straight path of travel on the longitudinal axis thereof to move the decapper around its pivotal support whereby the cap is removed without changing the angle of inclination of the bottle.

17. In a vending machine for bottled goods means for elevating a bottle through a vertical path of travel; means for holding the bottle in a substantially upright position and thereafter to a position for pouring the contents thereof into a suitable container as the same is elevated; a pivotally mounted decapper in the path of travel and disposed to engage the cap of the bottle when in the substantially upright position; and means for forcing the bottle through a straight path of travel on the longitudinal axis thereof to move the decapper around its pivotal support whereby the cap is removed without changing the angle of inclination of the bottle.

18. In a vending machine for bottled goods, means for positioning a bottle in a substantially upright position; a pivotally mounted, freely movable decapper having its pivotal point to one side of the longitudinal axis of the bottle; and means for moving the bottle along a straight path of travel on its longitudinal axis to impart movement to the decapper through the bottle to swing the decapper about its pivotal point to pry the cap from said bottle.

19. In a vending machine for capped bottles, a rack for supporting the bottles; means for moving the bottles into a discharged position; apparatus for decapping and pouring the contents of the bottle into a suitable container; and means for rendering inoperative the decapping and pouring apparatus when an uncapped bottle is fed into the discharged position.

OLAF CHRISTOPHER OLSEN.